(12) United States Patent
Buffa

(10) Patent No.: US 10,401,645 B2
(45) Date of Patent: Sep. 3, 2019

(54) NOSEPAD FOR AN EYEGLASSES NOSEPIECE AND A CONNECTING SYSTEM BETWEEN PIN AND NOSEPAD IN AN EYEGLASSES NOSEPIECE

(71) Applicant: LUXOTTICA S.R.L., Agordo (IT)

(72) Inventor: Federico Gianluigi Buffa, San Gillio (IT)

(73) Assignee: LUXOTTICA S.R.L., Agordo (IT)

( * ) Notice: Subject to any disclaimer, the term of this patent is extended or adjusted under 35 U.S.C. 154(b) by 59 days.

(21) Appl. No.: 14/407,182

(22) PCT Filed: Jun. 13, 2013

(86) PCT No.: PCT/IB2013/054841
§ 371 (c)(1),
(2) Date: Dec. 11, 2014

(87) PCT Pub. No.: WO2013/186731
PCT Pub. Date: Dec. 19, 2013

(65) Prior Publication Data
US 2015/0160472 A1    Jun. 11, 2015

(30) Foreign Application Priority Data

Jun. 14, 2012 (IT) .............................. BO2012A0328

(51) Int. Cl.
*G02C 1/02* (2006.01)
*G02C 5/12* (2006.01)

(52) U.S. Cl.
CPC ................ *G02C 5/12* (2013.01); *G02C 1/02* (2013.01); *G02C 5/126* (2013.01); *G02C 2200/12* (2013.01)

(58) Field of Classification Search
CPC .............................................. G02C 5/12–5/128
(Continued)

(56) References Cited

U.S. PATENT DOCUMENTS 2,029,470 A * 2/1936 Durgin .................... G02C 5/12
351/137
4,040,729 A * 8/1977 Winkler .................. G02C 5/12
351/137
(Continued)

FOREIGN PATENT DOCUMENTS

CN      2076244 U      5/1991
CN      1082204 A      2/1994
(Continued)

OTHER PUBLICATIONS

International Search Report for corresponding application PCT/IB2013/054841 filed Jun. 13, 2013; dated Sep. 9, 2013.
(Continued)

*Primary Examiner* — Zachary W Wilkes
(74) *Attorney, Agent, or Firm* — Cantor Colburn LLP

(57) ABSTRACT

A nosepad for an eyeglasses nosepiece comprises: a pad defining a supporting surface which can be rested directly on a wearer's nose; a connecting portion made as one with the pad and having a through hole by which it is connected to a mounting pin of a frame; and an insert which is at least partly embedded in the pad. The pad and the connecting portion are made entirely of an elastically deformable material which is transparent so that a graphical design and/or a text and/or an advertising logo appearing on the insert can be made visible from the outside.

5 Claims, 5 Drawing Sheets

(58) Field of Classification Search
USPC .................. 351/136–139, 65, 69, 78–82
See application file for complete search history.

(56) References Cited

U.S. PATENT DOCUMENTS

| | | | |
|---|---|---|---|
| 4,500,179 A * | 2/1985 | Schonhut | G02C 5/124 351/137 |
| 4,556,300 A | 12/1985 | Dietrich | |
| 4,695,140 A | 9/1987 | Bonani | |
| 4,806,009 A * | 2/1989 | Sordillo | G02C 5/12 351/132 |
| 5,457,506 A * | 10/1995 | Winkler | G02C 5/12 351/136 |
| 6,554,423 B2 * | 4/2003 | Kroman | G02C 5/12 351/136 |
| 2008/0068558 A1 * | 3/2008 | Pan | G02C 5/00 351/141 |

FOREIGN PATENT DOCUMENTS

| | | |
|---|---|---|
| EP | 0067373 A1 | 12/1982 |
| EP | 1469337 A1 | 10/2004 |
| FR | 2620832 A1 | 3/1989 |
| GB | 2132379 A | 7/1984 |
| JP | 10253929 A | 9/1998 |
| WO | 2012011059 A1 | 1/2012 |

OTHER PUBLICATIONS

Chinese Office Action for corresponding application CN2013800403025; dated Sep. 28, 2015.
CN OA issued Feb. 7, 2017 re: Application No. 201380040302.5; pp. 1-24; citing: EP 0067373 A1, U.S. Pat. No. 2029470 A, JP 10-253929 A.
EP Examination Report dated Apr. 4, 2019 re: Application No. 13 744 831.2, pp. 1-6, citing: EP 0 067 373 A1, GB 2 132 379 A, EP 1 469 337 A1, US 4 556 300 A, WO 2012/011059 A and FR 2 620 832 A1.

* cited by examiner

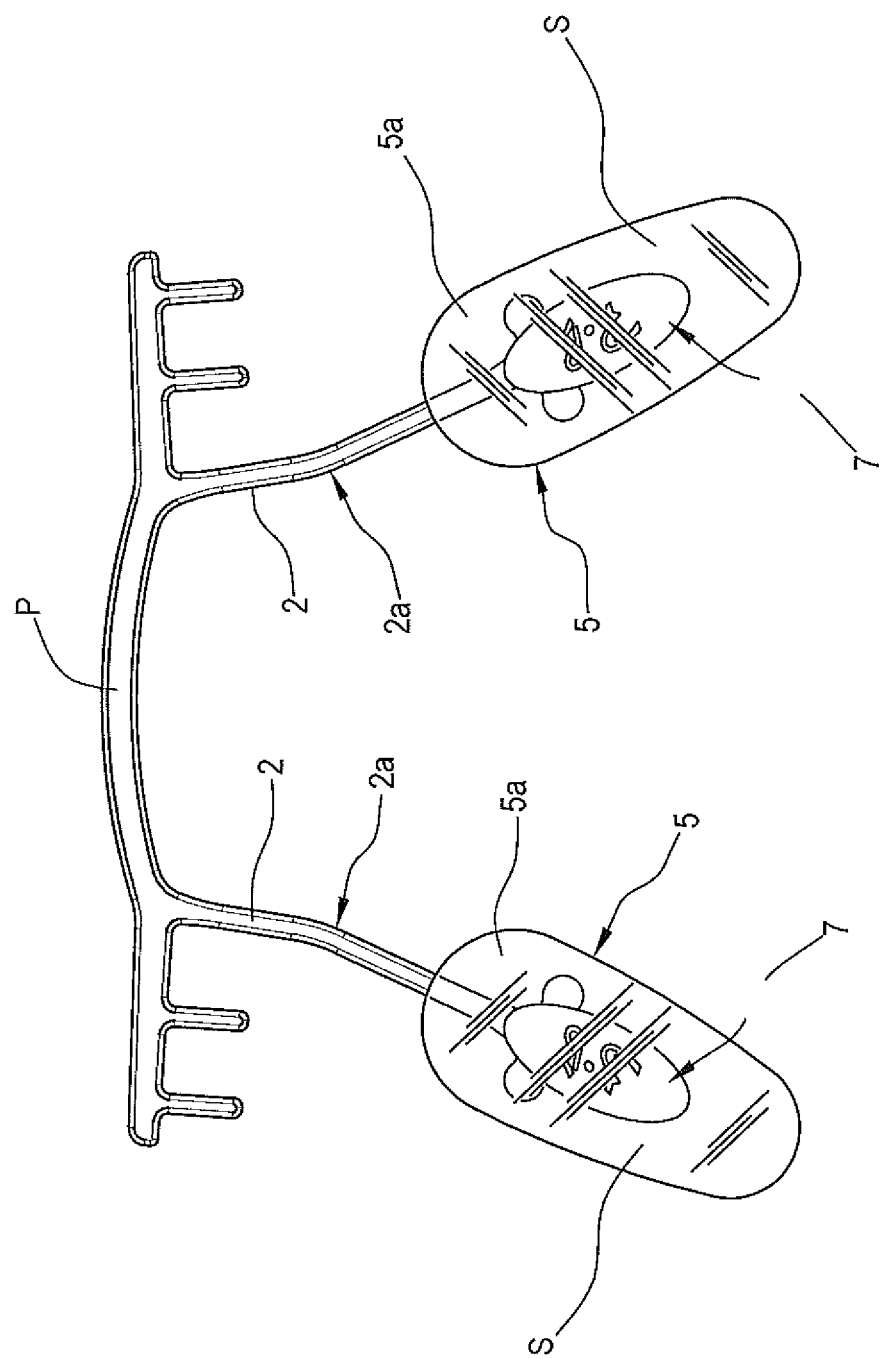

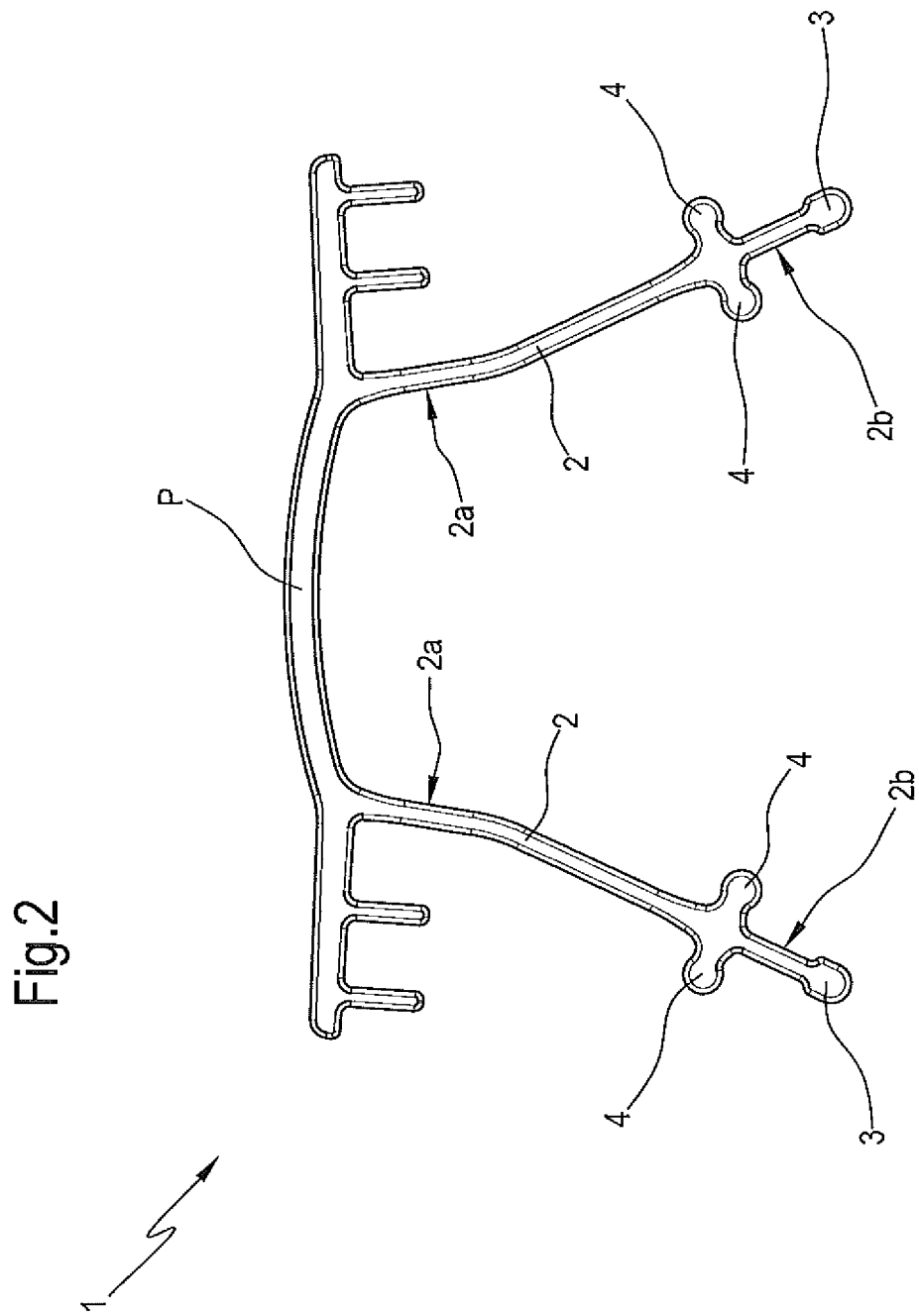

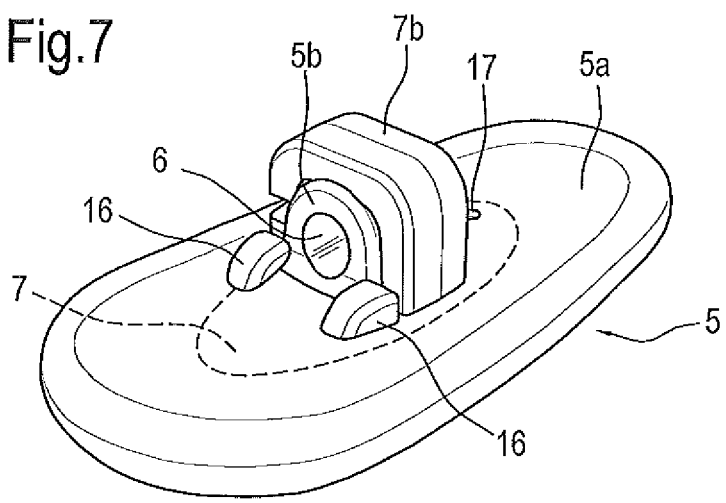
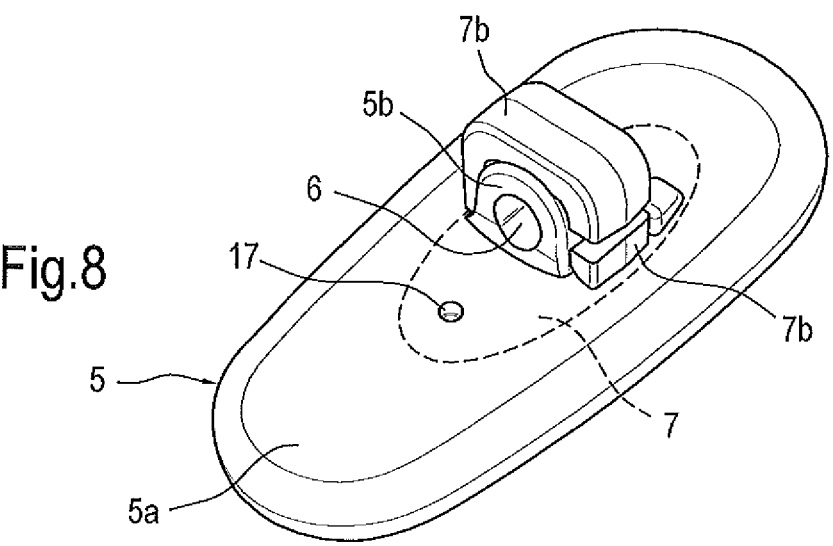
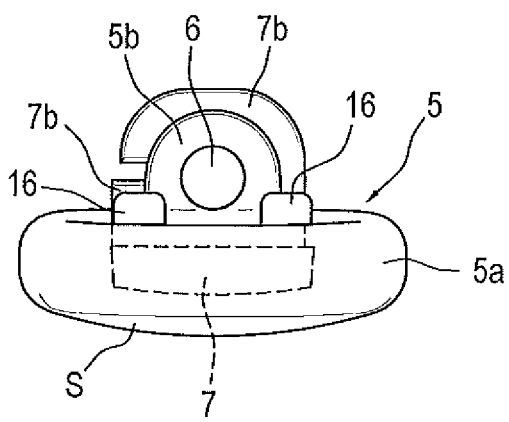

NOSEPAD FOR AN EYEGLASSES NOSEPIECE AND A CONNECTING SYSTEM BETWEEN PIN AND NOSEPAD IN AN EYEGLASSES NOSEPIECE

TECHNICAL FIELD

This invention relates to a nosepad for an eyeglasses nosepiece and to a system for its connection to a pin of an eyeglasses nosepiece.

BACKGROUND ART

In the eyeglasses sector, the nosepiece is the structure which forms part of the frame and which rests directly on the wearer's nose.

The nosepiece usually comprises a pair of pins which extend away from the bridge and which, at their lower ends, mount respective nosepads which are designed to come into direct contact with the wearer's nose. More specifically, the nosepads have a rear connecting portion which has a through hole made in it designed to receive the end of the respective pin.

It is known that for eyeglass comfort one of the main requirements of nosepads is that they must be adjustable in position in order to be able to adapt to the shape of the wearer's nose.

Known in the prior art, therefore, are solutions generally comprising hard nosepads which are movable to be adjusted to a certain extent. A solution of this kind is described in Italian patent application No. PD2003A000078, where the connection between the nosepad and the pin is obtained by tapering the through hole in which the pin is inserted, in particular from the ends of the hole towards the inside. This connecting system between nosepad and pin is also made in such a way as to limit the angular excursion of the nosepad relative to the pin.

Further, in the aforementioned prior art, solutions are also known to comprise an insert which is embedded in the nosepad and which bears the manufacturer's logo or other text, visible from the outside because the nosepiece is made of a rigid, transparent material.

Another known requirement in the eyeglass trade is for the nosepads to be easy to fit to (and removed from) the respective mounting arms so as to facilitate substitution.

In this perspective, the connecting portion with the hole used for connecting the nosepad to the pin is, in some prior art solutions, made of a deformable material. That way, the adjustability of the nosepad is provided by the deformability of the material the connecting portion is made of.

Disadvantageously, in the solutions with rigid nosepad, removing the nosepad from the pin (as well as fitting it to the pin) has been found to be difficult mainly on account of the high rigidity of the material the nosepad is made of.

Moreover, in solutions of this kind, it is difficult to guarantee the required nosepad adjustability because the parts making up the nosepad-pin joint must have a suitable geometry, especially for such adjustability to be reliable over time.

In the solutions where deformable material is used for the connecting portion, on the other hand, it has been found that it is difficult to add an insert to the inside of the nosepad and in these solutions, therefore, the nosepads cannot easily and effectively be provided with inserts bearing logos or text.

For example, documents EP0067373 and GB2132379 relate to nosepads for eyeglasses nosepieces where the connecting portion is made of an elastically deformable material.

In these solutions, the connecting portion is distinct and separate from the pad, since the pad is moulded onto the connecting portion to incorporate a part thereof. In these solutions, the part of the connecting portion that is incorporated in the pad may be decorated.

These solutions, however, have limitations and disadvantages. In effect, they give little freedom of choice and design in creating the decoration. Moreover, these solutions are not robust and involve the risk of the pad breaking off the connecting portion.

That is because the decoration is made on one face of the connecting portion and the choice of the material from which to make the connecting portion is conditioned by the very fact that this portion has a connecting function.

DISCLOSURE OF THE INVENTION

The aim of this invention is to provide a nosepad for an eyeglasses nosepiece which overcomes the above mentioned disadvantages of the prior art.

More specifically, the aim of this invention is to provide a nosepad for an eyeglasses nosepiece which allows the inclusion in the nosepad of an insert bearing a logo or text visible from the outside and which, at the same time, guarantees suitable ease of removing/fitting the nosepad from/to the respective pin.

Another aim of the invention is to provide a nosepad for an eyeglasses nosepiece which achieves a good standard of reliability over time in terms of nosepad adjustability on the respective pin, especially for nosepads having advertising inserts embedded in them.

These aims are fully achieved by the nosepad according to this invention as characterized in the appended claims.

More specifically, the nosepad according to the invention comprises a pad which is at least partly transparent and which defines a supporting surface which can be rested directly on a wearer's nose, a connecting portion fixed to the pad and having a through hole by which it is connected to a mounting pin of a frame, and an insert which is at least partly embedded in the pad and which is visible from the outside through a transparent portion of the supporting surface of the pad.

The nosepad according to the invention is characterized in that the connecting portion is made at least partly of a deformable material.

More specifically, this material (which the connecting portion is made of) is deformable at least elastically. The elastic deformability confers softness on the material and allows the nosepad to be connected to and disconnected from the pin, where the pin has an enlarged free end to prevent the pad from being pulled off accidentally.

It should be noted that the material the connecting portion is made of is at least partly deformable also plastically (that is to say, its deformability is partly elastic and partly plastic).

The deformable material is also transparent.

Preferably, the material (that is, the material the connecting portion is made of) is a flexible polymer material.

More specifically, the material is preferably selected from the group comprising rubber, silicone, plasticized PVC (that is PVC with additives designed to confer deformability on the PVC) or polymer blends.

Preferably, the pad and the connecting portion are made as a single piece and therefore of the same material (that is, the deformable material).

The surface of the insert bears a graphical design and/or a text and/or an advertising logo and the insert is visible from the outside through the nosepad's supporting surface, which is transparent.

The insert comprises a plate, bearing the graphical design and/or text and/or advertising logo, and which, on the side opposite the graphical design and/or text and/or advertising logo, has a pair of projections at least partly not coated with the deformable material.

Preferably, the projections are made as one with the plate.

Preferably, the plate is made of a rigid, galvanized material. This allows optimum compliance with fit tolerances between the insert and the mould used to make the nosepad.

Another object of this invention is a connecting system between the nosepad and a pin of an eyeglasses nosepiece.

More specifically, the connecting system comprises a mounting pin and a nosepad according to the invention, the nosepad being connected to the mounting pin by inserting the mounting pin into the through hole in the connecting portion of the nosepad.

Preferably, the mounting pin is associated with a pair of lateral protuberances extending away from the pin in respective opposite directions perpendicularly to the pin. The lateral protuberances and the pin together define a cross configuration which lies substantially in one common plane and which is designed to limit movement of the nosepad axially along the pin and/or pivotally about the pin.

Another object of this invention is a method for making a nosepad for an eyeglasses nosepiece, comprising the steps of preparing an insert in a mould and filling into the mould (for example by injection) a material in the liquid state (the material preferably having the properties described above) and such as to define, once solidified, a transparent and at least elastically deformable portion of the nosepad. The insert comprises a plate, which bears, on a front surface of it, a graphical design and/or a text and/or an advertising logo, and a pair of projections extending away from the plate on the side opposite the front surface.

In the method according to the invention, the insert is positioned in the mould in such a way that between the projections there is an empty space which can be filled with the moulding material.

The mould is defined by at least two parts, a first of which defines a bottom cavity designed to make the connecting portion of the nosepad and having, on opposite sides of the bottom cavity, a pair of protrusions.

The insert is positioned in the mould by resting the insert on the first part of the mould in such a way that each projection of the insert rests on a respective protrusion and in such a way that the bottom cavity is laterally delimited by the projections and protrusions, at the bottom on the side of the first part of the mould, and at the top on the side of the insert plate.

As a result, the insert can be embedded in the moulding material. More specifically, the plate is fully embedded in the material constituting the pad of the nosepad, whilst the free ends of the projections (whose function is to support the insert in the mould), since they rest on the protrusions, project from the material constituting the pad.

Also positioned in the bottom cavity defined by the first part of the mould is a movable cylindrical core, preferably of constant cross section, designed to make the through hole in the connecting portion of the nosepad.

With regard to the nosepiece according to the invention, it should also be noted that, preferably, the insert and the connecting portion of the nosepad are made of different materials. The connecting portion and, likewise, the nosepad, are made of a material which is transparent and soft (deformable at least elastically). The insert, on the other hand, is made of a rigid material.

Preferably, the insert comprises a plate and, preferably, this plate is made of a rigid material.

Preferably, the insert is embedded (incorporated) inside a part (a single piece) formed by moulding and comprising the nosepad and the connecting portion.

With regard to the method according to the invention, it should be noted that, preferably, the step of filling (the material in the liquid state into the mould) constitutes a step of moulding in a single piece the pad (of the nosepad) and the connecting portion (of the nosepad).

Preferably, this moulding step is performed in such a way that the insert is at least partly embedded in the pad and in such a way that it is visible from the outside through the transparent portion of the pad.

It is stressed that comfort for the wearer of the eyeglasses is an important aspect of the invention.

To make the nosepad comfortable, the pad is made of a soft material.

Thus, the connecting portion, which is made by moulding together with the pad, is also made of a soft material.

This material is at least partly elastic to allow the hole in the connecting portion to be widened when the pin is passed through it and then to return to its condition prior to widening to prevent the pin of the connecting portion from falling out accidentally.

The material the pad and the connecting portion are made of, however, is soft and partly plastic in order to allow the nosepad to adapt partly (irreversibly) to the shape of the nose of the person wearing the eyeglasses.

In light of this, the insert preferably has at least one projection configured to encircle the outside of the perforated connecting portion, elastically imparting its shape thereto.

This has the effect of preventing the hole from losing its shape and elasticity, even after extended use and repeated insertion and extraction of the pin from the nosepad, thereby avoiding the risk of the nosepad accidentally falling off the pin.

It should also be noted that the pad preferably has a hole on the face of it directed towards the connecting portion. This hole puts a portion of the insert embedded in the pad in communication with the outside of the nosepad.

The purpose of the hole in the pad is to keep the insert securely in the correct position inside the mould by resting that portion of the insert on a stem projecting from the mould during injection moulding of the pad and connecting portion.

Further, to make the fastening of the nosepad to the pin even more secure and robust, the pad defines two bulges projecting from the same side as the connecting portion. These bulges are configured to interact with the pin to limit or dampen the twisting movements of the nosepad relative to the pin (tilting about the axis of the pin). More specifically, these bulges are operatively in contact with the lateral protrusions of the pin.

BRIEF DESCRIPTION OF THE DRAWINGS

These and other features of the invention will become more apparent from the following detailed description of a preferred, non-limiting example embodiment of it, with reference to the accompanying drawings, in which:

FIG. 1 shows an eyeglasses nosepiece according to this invention;

FIG. 2 shows the nosepiece of FIG. 1, with the nosepads removed in order to better illustrate the mounting arms of the nosepiece;

FIG. 7 is a perspective view showing a variant embodiment of the nosepad of FIG. 4;

FIG. 8 is a different perspective view showing the nosepad of FIG. 7;

FIG. 9 shows the nosepad of FIG. 7, in a side view.

DETAILED DESCRIPTION OF PREFERRED EMBODIMENTS OF THE INVENTION

Figure 4:
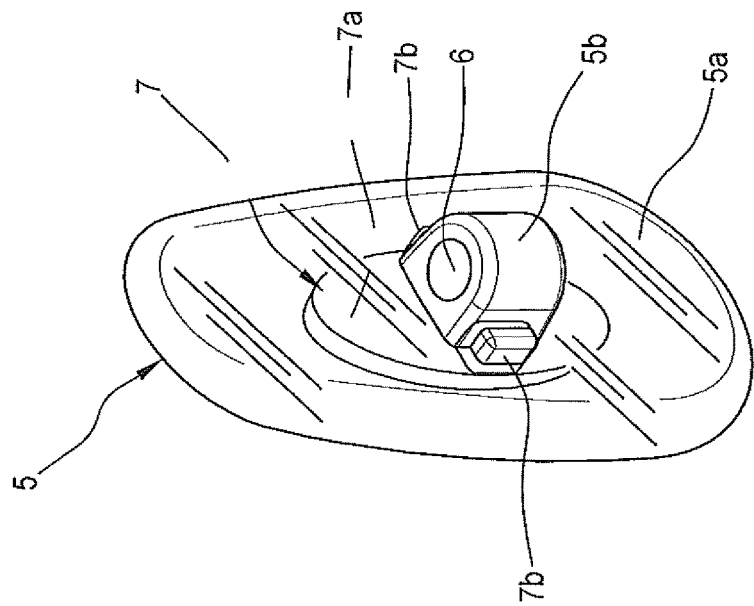
FIG. 4 is a perspective view of a nosepad according to the invention and used on the nosepiece of FIG. 1.

In the accompanying drawings, the numeral 1 denotes in its entirety a nosepiece for eyeglasses, associated with a part of a frame (more specifically, the bridge "P" of a frame).

As shown in FIGS. 1 and 2, the nosepad comprises a pair of arms 2 which extend away from the bridge "P" in a direction substantially perpendicular thereto.

Each arm 2 has, at the free end of it opposite the bridge "P", a wide-section portion 3.

Preferably, each arm 2 also has a pair of lateral protuberances 4 which extend in opposite directions and divide the arm 2 into an upper, supporting portion 2a and a lower, fastening portion 2b.

The lateral protuberances 4 and the lower portion 2b of the arm are oriented in such a way as to form, together, three co-planar branches whose function is explained below.

In the embodiment illustrated, the cross section of the arms 2 is quadrangular, and more specifically, rectangular or square. Their cross section might, however, have a different shape, for example circular.

As shown in FIG. 1, each arm 2 is associated with a nosepad 5 mounted at the lower end of the arm and, more specifically, at the lower, fastening portion 2b, which thus defines a mounting pin for the nosepad 5.

Figure 3:
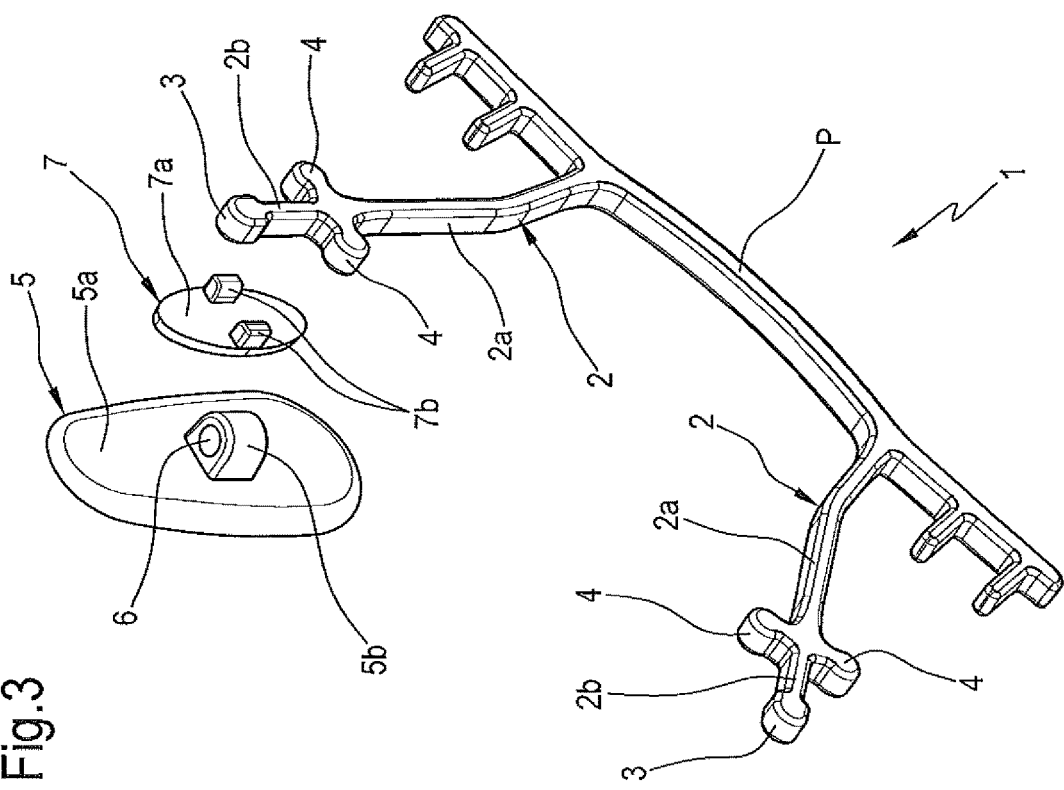
FIG. 3 is an exploded perspective view of the nosepiece of FIG. 1.

More in detail, as shown in FIGS. 3 and 4, the nosepad comprises a pad 5a which is at least partly transparent and which defines a supporting surface "S" which can be rested directly on a wearer's nose, and a connecting portion 5b fixed to the pad 5a and having a through hole 6 by which it is connected to the mounting pin 2b (defined by the lower, fastening portion 2b of the arm 2).

In the embodiment illustrated, the through hole 6 has a circular cross section. Its cross section, however, might have a different shape, for example, rectangular or square.

Whatever the case, the cross section of the through hole 6 is preferably uniform along the full length of the hole 6.

Preferably, the supporting surface "S", which may be flat or slightly convex, is substantially elliptical in shape, with a main direction of extension along the axis of the through hole 6.

More specifically, the connecting portion 5b is located on the side opposite the supporting surface "S".

Within the pad 5a there is an at least partly embedded insert 7, which is visible from the outside through a transparent portion 8 of the supporting surface "S" of the pad 5a.

The insert 7 comprises a substantially flat plate 7a bearing, on a front surfaces of it facing the supporting surface "S", a graphical design and/or a text and/or an advertising logo.

The plate 7a of the insert 7 is entirely embedded in the material constituting the pad 5a.

The insert 7 also comprises a pair of projections 7b which are at least partly not embedded in the pad 5a and which are associated with the plate 7a, on the back thereof (that is to say, on the side opposite the surface bearing the graphical design and/or text and/or advertising logo).

In other words, at least an end part of the projections 7b extends beyond the outer dimensions of the pad 5a, as shown in FIG. 4.

The two projections 7b are parallel to, and spaced from, each other in such a way that the two projections 7b are positioned on opposite sides of the connecting portion 5b. In other words, the connecting portion 5b is included between the two projections 7b of the insert 7.

Advantageously, at least the connecting portion 5b is made of a material which is deformable at least elastically.

Preferably, the pad 5a and the connecting portion 5b are made as one piece with the aforementioned material which is deformable (at least elastically or at least partly elastically).

Advantageously, the at least elastically deformable material is transparent and is preferably an elastically flexible polymeric material. For example, the material is a material selected from the group comprising rubber, silicone, plasticized PVC (that is PVC with additives designed to confer deformability on the PVC) or polymer blends.

The insert 7, on the other hand, is made of a rigid, galvanized material, preferably a plastic material. This enables precise compliance with mould tolerances, which is very difficult with inserts made of metal.

In a connecting system (joint) between pin 2b and nosepad 5 in a nosepiece for eyeglasses, as shown in FIGS. 2 and 3, the nosepad 5 is connected to the mounting pin 2b by insertion of the mounting pin 2b into the through hole 6 of the connecting portion 5b.

The coupling between the pin 2b and the hole 6 may be an interference fit (preferable solution), in which case the adjustability of the nosepad 5 is provided by the deformability of the material the connecting portion 5b is made of, or a clearance fit, in which case the adjustability of the nosepad 5 is provided by the clearance between the pin 2b and the hole 6.

The wide-section portion 3 at the end of the arm 2 provides the means whereby the connecting portion 5b is held to the arm 2 since the connecting portion 5b remains confined between the wide-section portion and the two lateral protuberances 4 of the arm 2.

Figure 5:
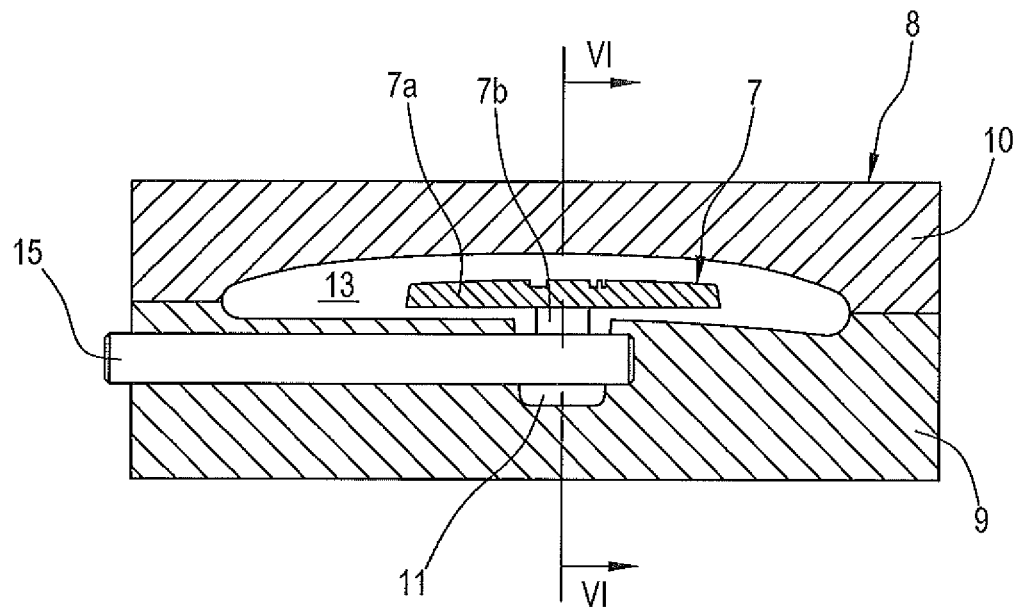
FIG. 5 shows a mould used for making the nosepad of FIG. 4 in a cross section through the line V-V of FIG. 6.
Figure 6:
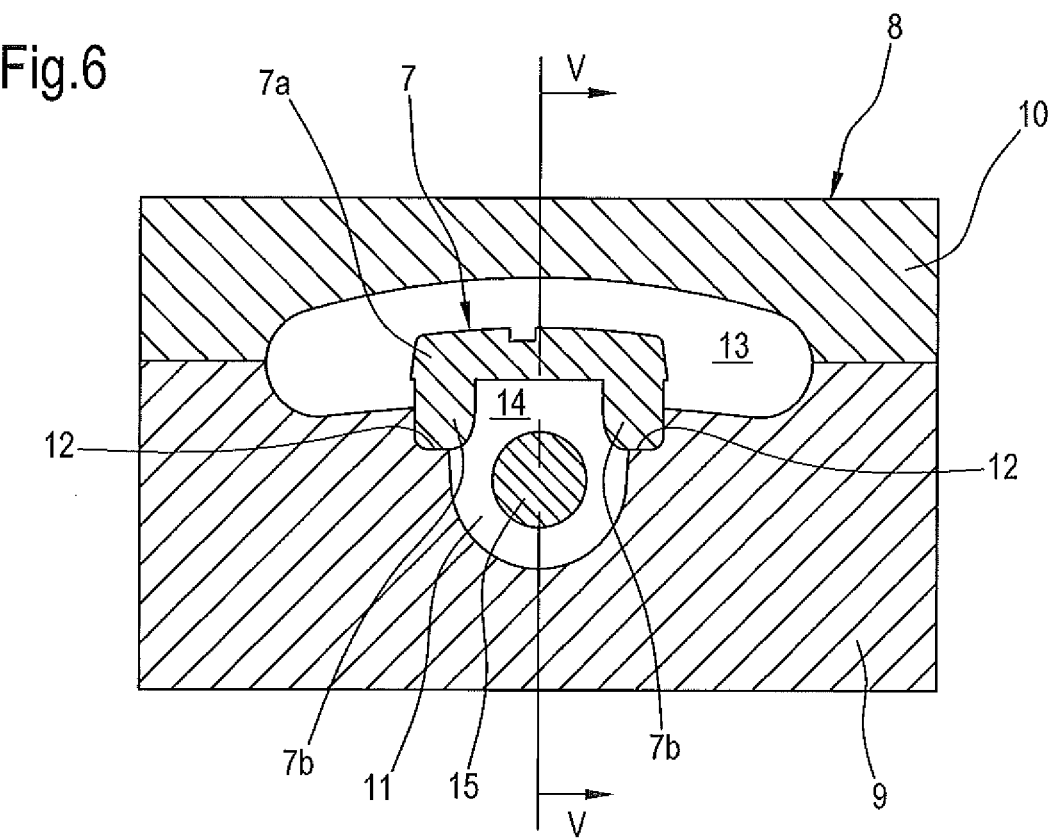
FIG. 6 shows the mould of FIG. 5 in a cross section through the line VI-VI.

Moreover, the pad 5a of the nosepad 5 remains with its rear surface in abutment against the two lateral protuberances 4, which thus limit the angular excursion of the nosepad 5 in rotation about the axis of the hole 6. FIGS. 5 and 6 show a mould 8 for making a nosepad 5 according to the invention in two cross section views along perpendicular directions.

The mould 8 comprises a first portion (or lower half-mould) 9 and a second portion (or upper half-mould) 10.

The first portion 9 of the mould 8 has a bottom cavity 11 designed to make the connecting portion 5b of the nosepad 5 and, viewed in transversal cross section, being substantially in the shape of a U.

At the sides of the bottom cavity 11 there are two protrusions 12 defining supporting points for the projections 7b of the insert 7. More specifically, therefore, the distance between the protrusions 12 substantially corresponds to the distance between the projections 7b of the insert.

Astride the intersection between the two parts 9, 10 of the mould 8 there is an upper cavity 13 which is designed to make the pad 5a of the nosepad 5.

The upper cavity 13 and the bottom cavity 11 are in communication with each other and sitting operatively astride them is the insert 7.

The insert 7, however, does not entirely separate the two cavities 11, 13 since the extension of the insert 7 in the plane defined by its plate 7a is less than the extension of the pad 5a of the nosepad 5 and the material constituting the pad 5a fully covers the plate 7a of the insert 7 (FIGS. 5 and 6).

In the bottom cavity 11 there is also a movable core 15 designed to make the through hole 6 in the connecting portion 5b.

A method for making the nosepad 5 according to the invention comprises the following steps:
preparing the mould 8 described above;
preparing an insert 7 in the mould 8;
filling the mould 8 (preferably by injection, or by casting) with a material having the properties described above) in the liquid state and such as to define, once cooled, a transparent and at least elastically deformable portion of the nosepad 5.

The step of preparing the insert 7 in the mould 8 is accomplished by resting the projections 7b of the insert 7 on the protrusions 12 of the mould 8 in such a way that between the protrusions 7b there is an empty space which can be filled with the moulding material. More specifically, the empty space defines a part of the bottom cavity 11 designed to make the connecting portion 5b.

In this situation, the bottom cavity 11 is delimited laterally by the projections 7b and the protrusions 11, at the bottom on the side of the first part 9 of the mould, and at the top on the side of the plate 7a of the insert 7.

The step of filling the liquid material into the mould 8 thus makes the pad 5a and the connecting portion 5b as a single piece by a single technological moulding process.

The present invention achieves the preset aims, overcoming the disadvantages of the prior art.

Making the connecting portion from material which is deformable at least elastically facilitates fitting and removal of the nosepad to and from the respective pin.

Moreover, making the pad and the connecting portion as a single piece from a transparent and elastically deformable material makes it possible to obtain a nosepad provided with an embedded insert and having excellent properties of adjustability on the pin and good reliability of fitting/removing the nosepad thanks to the material used.

With regard to the variant embodiment of the nosepad illustrated in FIGS. 7-9, attention is drawn to the following.

The insert 7 comprises at least one projection 7b, which is (at least partly) not covered by the deformable material. Preferably, the insert 7 comprises the plate 7a and the projection 7b extends from the plate 7a. Preferably, the insert 7 has two projections 7b which preferably extend from the plate 7a in the same direction as that in which the connecting portion 5b protrudes (that is, the direction opposite to that in which the supporting surface S faces).

Preferably, at least one of the projections 7b has a portion which is located on the outside of the perforated connecting portion 5b and is in contact therewith to encircle it. Thus, the projection 7b encircles the outside of the connecting portion 5b. The projection 7b defines an elastic element. In light of this, it should be noted that the projections 7b do not surround the connecting portion 5b completely but have a break in them.

The projection 7b encircling the connecting element 5b to define an elastic element is configured to apply its elastic force to counteract expansion of the connecting portion 5b (resulting from expansion of the hole 6 therein). Also, preferably, the pad 5a defines on the face from which the connecting portion 5b protrudes two bulges 16 (made by moulding).

The bulges 16 are a pair of bulges. The bulges 16 are located on one side of the connecting portion 5b in the proximity of a mouth of the hole 6 of the selfsame connecting portion 5b.

Thus, the bulges 16 are positioned at a predetermined distance from the connecting portion 5b, relative to the direction defined by the axis of the hole 6 in the connecting portion 5b itself.

Preferably, the bulges 16 are spaced from one another (along a direction perpendicular to the axis of the hole 6) by a distance greater than the diameter of the hole 6 in the connecting portion 5b. Also, preferably, the bulges 16 are positioned symmetrically about an axis of the hole 6.

Operatively, when the nosepad 5 is mounted on the pin 2b, the lateral protuberances 4 rest on the bulges 16. Thus, the bulges limit the tilting movement about the axis of the hole 6 of the nosepad 5. Since the bulges 16 are made of the soft, flexible material, the tilting movement is not entirely prevented but reduced and dampened. Advantageously, this makes the nosepad and the fastening system thereof particularly robust and reliable, even after prolonged use.

Also, preferably, the pad 5a defines a hole 17 on the face from which the connecting portion 5b protrudes. The hole 17 places a portion of a surface of the insert 7 facing the direction opposite to the supporting surface S of the pad 5a in communication with the outside of the nosepad 5.

The purpose of the hole is to help keep the insert 7 in the correct position when it is inside the mould, during moulding. In other words, this hole is a result of the fact that the mould comprises a stem onto the end of which the insert 7 rests (the insert also being supported on the mould by the at least one projection 7b). The hole 17 corresponds to the volume occupied by the part of the stem surrounded by the injected material during moulding.

The invention claimed is:

1. A nosepad for an eyeglasses nosepiece, comprising:
a pad which is at least partly transparent and which defines a supporting surface which is adapted to rest directly on a wearer's nose;
a connecting portion fixed to the pad and having a through hole by which it is connectable to a mounting pin integral with a frame of the eyeglasses;
an insert which is at least partly embedded in the pad and which is visible from the outside through a transparent portion of the supporting surface of the pad;
wherein at least the connecting portion of the nosepad is made of a material which is deformable partly plastically and partly elastically,
wherein the insert comprises a plate having, on a side opposite the supporting surface of the pad, a pair of projections which are at least partly not coated with the deformable material, said pair of projections being at least partly not embedded in the pad, and being arranged on opposite sides of the connecting portion, wherein at least one of the projections has a portion which is located on the outside of the connecting portion and is in contact therewith to encircle it, and wherein the at least one projection encircling the connecting portion defines an elastic element configured to counteract expansion of the connecting portion.

2. The nosepad according to claim 1, wherein the insert has a surface which bears a graphical design and/or a text and/or a logo.

3. The nosepad according to claim 1, wherein the insert is made of a rigid galvanized material.

4. The nosepad according to claim 1, wherein the insert and the connecting portion of the nosepad are made of different materials.

5. The plate according to claim 1, wherein the insert is embedded in a part formed by moulding and comprising the pad and the connecting portion.

* * * * *